US012769447B2

(12) United States Patent
Kunt et al.

(10) Patent No.: US 12,769,447 B2
(45) Date of Patent: Oct. 20, 2026

(54) COMPRESSION PREDICTION MODEL USING INPUT DATA PARAMETERS AND USING ARTIFICIAL INTELLIGENCE AND MACHINE LEARNING ALGORITHM

(71) Applicant: Dell Products L.P., Round Rock, TX (US)

(72) Inventors: Maksymilian Kunt, Gdańsk (PL); Mateusz Robert Kosior, Wrocław (PL); Szymon Filip Kozłowski, Lubuskie (PL); Piotr Andrzej Przytuła, Gdansk (PL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/035,585

(22) Filed: Jan. 23, 2025

(65) Prior Publication Data

US 2026/0211551 A1 Jul. 23, 2026

(51) Int. Cl.
*G06F 3/06* (2006.01)

(52) U.S. Cl.
CPC .......... *G06F 3/0608* (2013.01); *G06F 3/0641* (2013.01); *G06F 3/0673* (2013.01)

(58) Field of Classification Search
CPC ..... G06F 3/0608; G06F 3/0641; G06F 3/0673
See application file for complete search history.

(56) References Cited

U.S. PATENT DOCUMENTS

2017/0017407 A1* 1/2017 Wei ........................ G06F 3/0608
2019/0108330 A1* 4/2019 Sikder ...................... G06F 21/44
2022/0294470 A1* 9/2022 de Abreu Pinho ..... G06F 16/17

* cited by examiner

*Primary Examiner* — Larry T MacKall
(74) *Attorney, Agent, or Firm* — Chamberlain, Hrdlicka, White, Williams & Aughtry; Aly Z. Dossa

(57) ABSTRACT

A method for managing a storage of data includes obtaining, by a compression optimization manager, a request to compress and store data using a compression algorithm. In response to the request: the method further includes selecting a portion of the data, prior to performing the compression algorithm on the portion of the data, applying a compression prediction model generated using artificial intelligence and/or machine learning to the portion of the data using input data parameters and the compression algorithm to obtain a determination that the portion of the data is to be compressed for storage, based on the determination, applying the compression algorithm on the portion of the data to obtain a compressed portion, and storing the compressed portion in a storage system. The compression prediction model, in turn, is an artificial intelligence model.

17 Claims, 5 Drawing Sheets

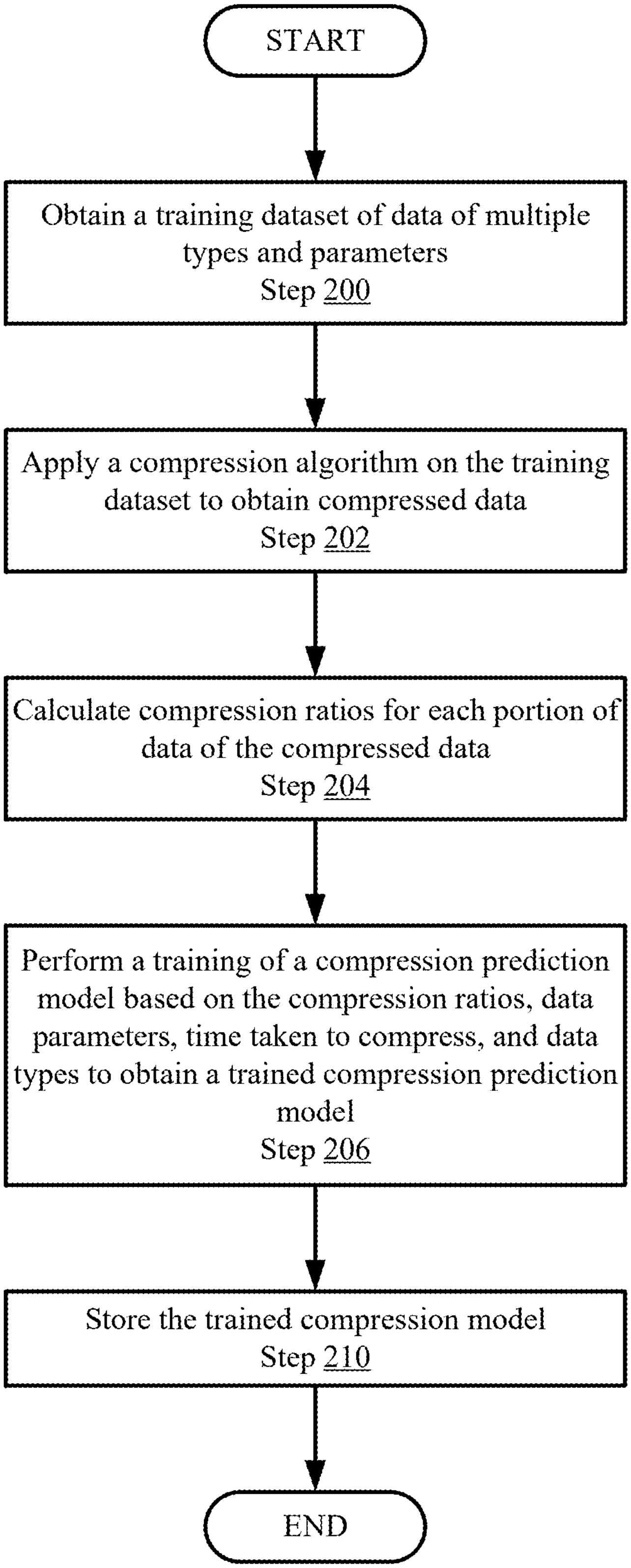
FIG. 2.1

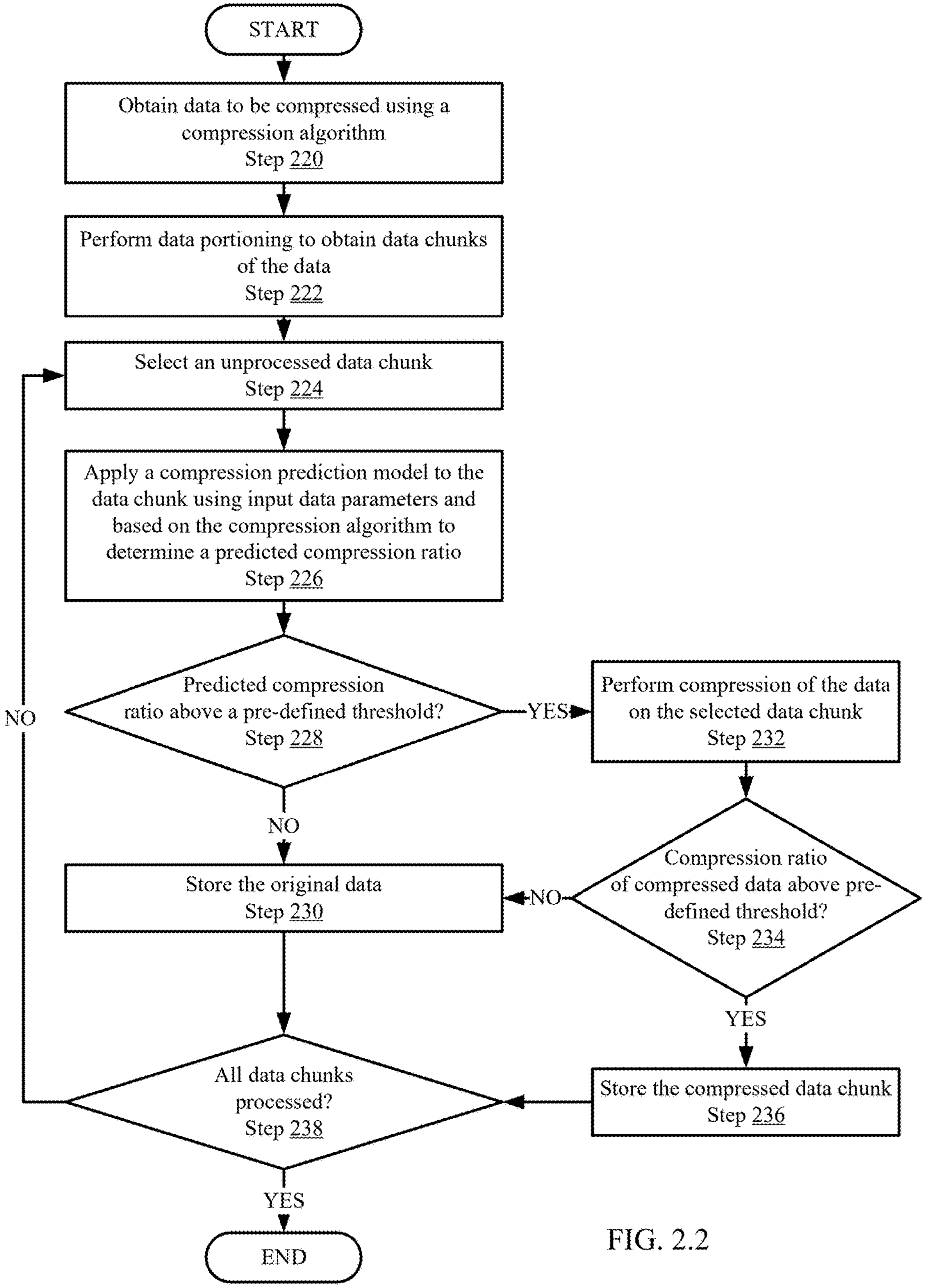
FIG. 2.2

COMPRESSION PREDICTION MODEL USING INPUT DATA PARAMETERS AND USING ARTIFICIAL INTELLIGENCE AND MACHINE LEARNING ALGORITHM

BACKGROUND

Computing devices in a system may include any number of computing resources such as processors, memory, and persistent storage. The storage of large amounts of data may require large amounts of computing resources. The larger the data, the more computing resources required to perform the storage of such data.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 2.1 shows a flowchart for a method for generating a compression prediction model in accordance with one or more embodiments of the invention.

FIG. 2.2 shows a flowchart for processing the storage of data in accordance with one or more embodiments of the invention.

DETAILED DESCRIPTION

Figure 1:
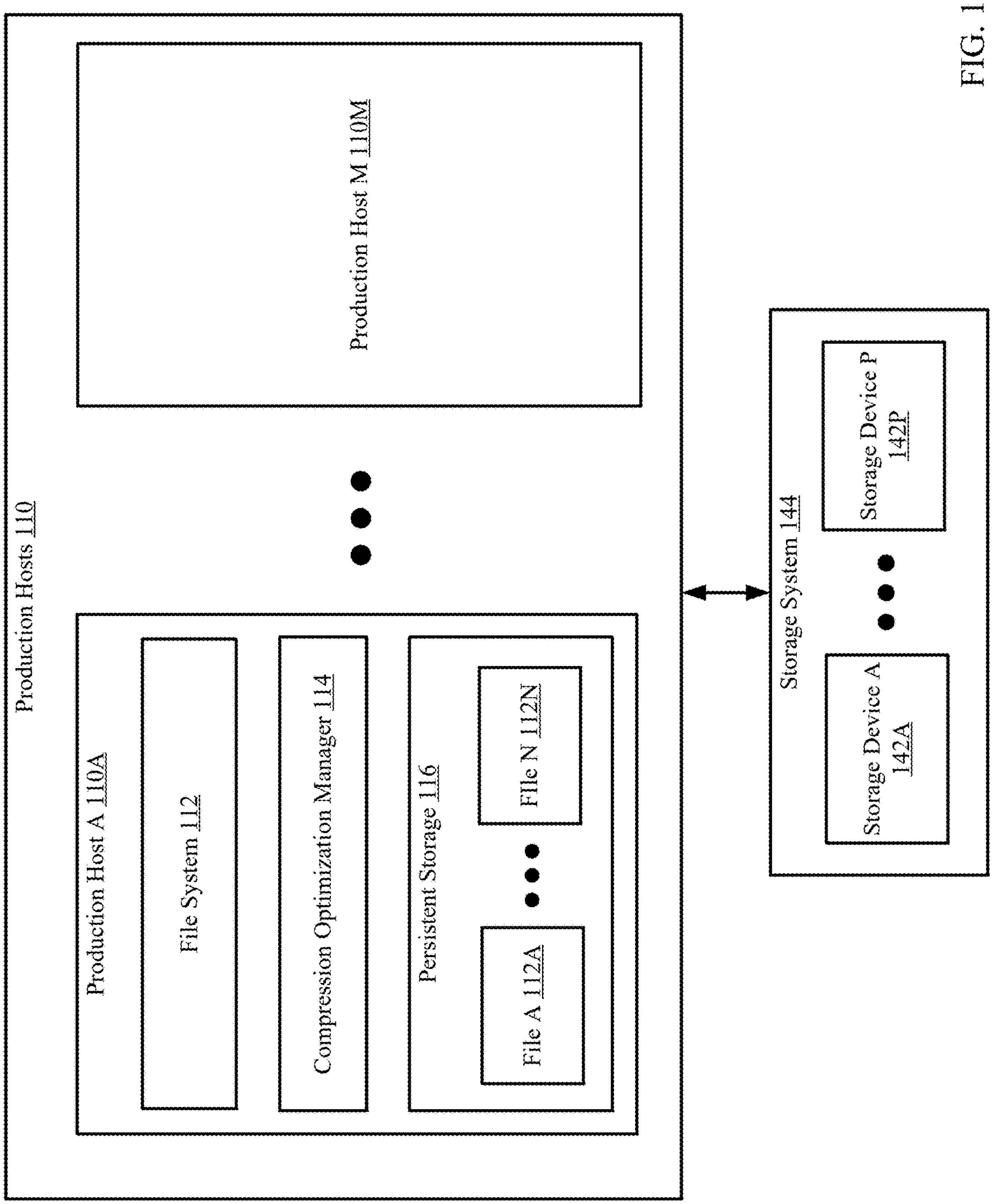
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing the storage of data in a storage system. Embodiments of the invention may include the use of a compression prediction model that inputs data parameters associated with a file or a portion of data (such as a data chunk) and determines whether compression is beneficial for storing the portion of data. The compression prediction model may not include applying the compression on the portion of data to make such determination.

In traditional data storage using compression, the determination about whether to store compressed data or original data may be made by applying the compression on the original data, calculating a compression ratio resulting from the compression, and storing the compressed data if the compression ratio is above a threshold and storing the original data otherwise. A compression ratio may refer to a ratio of the data size of the original data prior to being compressed (i.e., undergoing a compression algorithm) to the data size of the compressed data.

Embodiments of the invention instead utilize machine learning and/or other artificial intelligence algorithms to make such determination without requiring the compression to be applied. The compression ratios may be predicted using the compression prediction model. The time taken to predict compression ratios is lower than the time taken to compress data. In one or more embodiments, the time taken to store a combination of compressed and uncompressed data may be reduced when using the compression prediction model if the total time to predict all data is lower than the total time taken to compress the data that is stored uncompressed.

FIG. 1 shows a diagram of a system in accordance with one or more embodiments of the invention. The system includes one or more production hosts (110) and a storage system (144). The system may include additional, fewer, and/or different components without departing from the invention. Each component may be operably connected to any of the other components via any combination of wired and/or wireless connections. Each component illustrated in FIG. 1 is discussed below.

In one or more embodiments of the invention, the production hosts (110) host file systems (112). The file system (112) is an application that manages the storage, access of files (112A, 112N) stored in persistent storage (e.g., 116). Each file (112A, 112N) may be accessed via a directory. The directory may specify a file path for each file (112A, 112N) in the file system (112). The file system (112) (and/or the files (112A, 112N) managed by the file system (112)), may be compressed by a lossless or lossy compression algorithm as implemented by the compression optimization manager (114) of the respective production host (110A, 110M). The compressed file system data (or any other compressed data) may be stored in persistent storage (116) of the production host (110A, 110M).

As used herein, a compression algorithm refers to an algorithm that encodes portions of data objects (e.g., files (112A, 112N)) and/or portions of the file system (112) such that the encoded portions take up less data than the original portions for the purpose of reducing the total amount of data used by the file in storage. For a lossless compression algorithm, the data objects that have undergone lossless compression may be restored to the original data through decoding the encoded portions without any data loss. Examples of lossless compression algorithms include a Lempel-Ziv-Markov chain algorithm (LZMA), Lempel-Ziv Welch (LZW), Lempel-Ziv algorithm 4 (LZ4), free lossless audio codec (FLAC), run-length encoding (RLE), and/or other types of compression without departing from the invention. In contrast to a lossless compression algorithm, a lossy compression algorithm is a compression algorithm that may produce data loss after uncompressing.

In one or more embodiments of the invention, each compression algorithm may include variations based on parameters that impact the compression ratio. By impacting the compression ratio of the compression algorithm, one variation of a compression algorithm may be considered as a separate compression algorithm from a second variation of a first compression algorithm. For example, one variation of a LZ4 algorithm may include a modification to an acceleration level parameter to increase speed of compression with a trade-off of a lower compression ratio. A second variation may include lowering the acceleration level parameter to optimize compression ratio over total time to compress. Accordingly, the first variation may be considered one compression algorithm, and the second variation may be considered as a second, separate compression algorithm. As used herein, each variation of a compression algorithm may be referred to as a variation or a separate compression algorithm without departing from the invention.

In one or more embodiments, data parameters of the data being compressed may impact the total time taken to compress the data. Examples of data parameters include, but are not limited to, a file type (e.g., an extension type of the file), a pop count (i.e., a number of set bits in the given data), a data chunk entropy (i.e., a level of disorder of the corresponding data), and an upper count (i.e., a number of bytes in the given data with a highest bit set).

In one or more embodiments of the invention, the compression optimizing manager (114) includes functionality for managing the compression of data in the production host (110A) prior to storage. Specifically, the compression optimizing manager (100) performs the method of FIGS. 2.1-2.2 to identify data to be stored in a compressed format or stored as the original data.

In one or more embodiments, the compression optimizing manager (114) includes functionality for determining whether data is to be compressed prior to storage. Such determination may be based on whether the compression ratio for applying a given compression algorithm to a given portion of data exceeds a pre-defined threshold. To perform such determination, the compression optimization manager (114) may predict the compression ratio of applying a compression algorithm to a given portion of data without applying the compression. This determination may be performed using, for example, a compression prediction model. The compression prediction model may be generated in accordance with the method of FIG. 2.1 and used in accordance with the method of FIG. 2.2. An example compression prediction model is discussed in FIG. 3.

Figure 4:
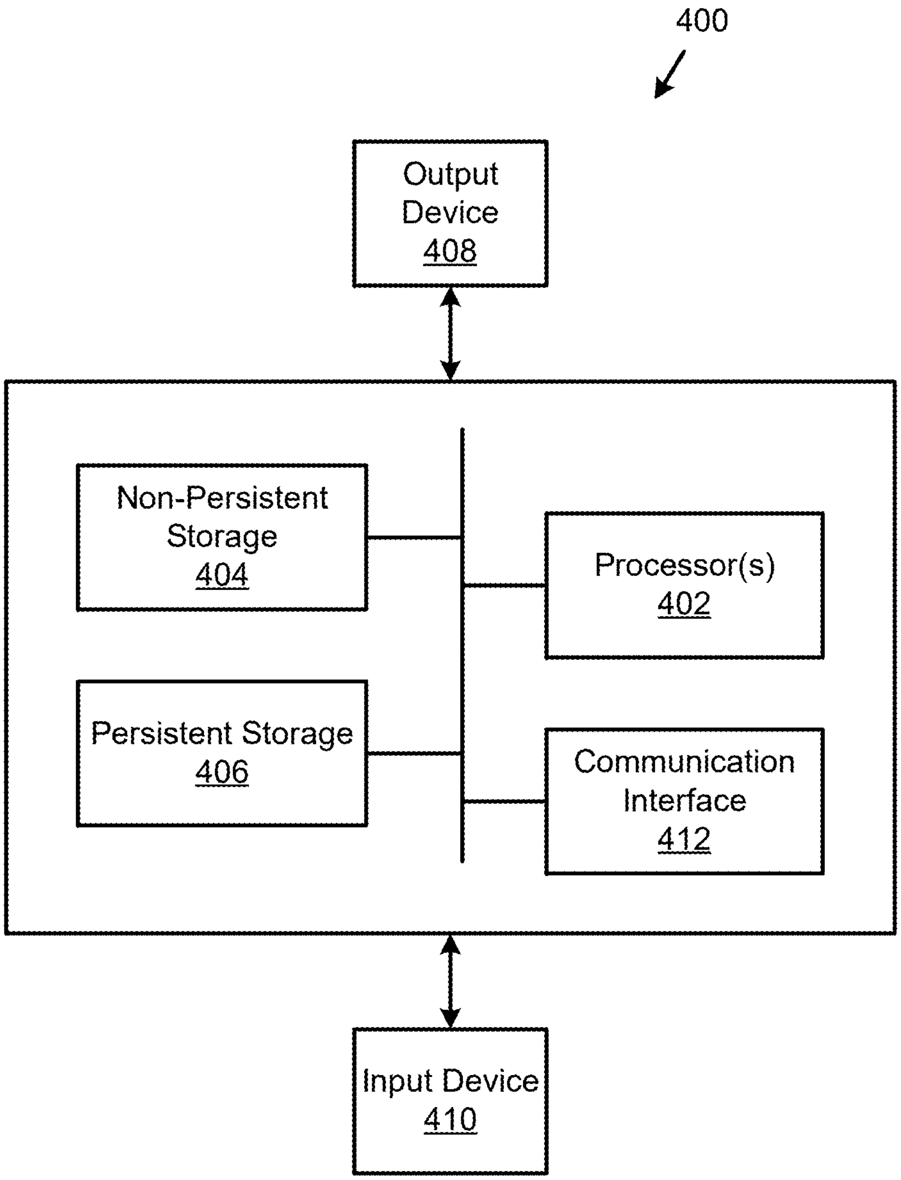
FIG. 4 shows a diagram of a computing device in accordance with one or more embodiments of the invention.

In one or more embodiments of the invention, a compression optimizing manager (114) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the compression optimizing manager (114) described throughout this application.

In one or more embodiments of the invention, the compression optimizing manager (114) is implemented as a logical device. The logical device may utilize the computing resources of any number of computing devices and thereby provide the functionality of the compression optimizing manager (114) described throughout this application.

In one or more embodiments of the invention, each production host (110A, 110M) may be associated with an architecture. An architecture may be a structure in which production hosts operate and communicate with other production hosts of similar architectures. Each production host of a similar architecture may share, for example, a similar operating system, a similar network protocol, and/or include similar computing resources. Collectively, the production hosts (110) may be associated with one or more architectures. Examples of architectures of production hosts include, but are not limited to, cloud services, virtual machines, data centers, on-premise computing environments for enterprises, and/or other computing environments.

In one or more embodiments of the invention, each of the production hosts (110A, 110M) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host (110A, 110M) described throughout this application.

In one or more embodiments of the invention, each of the production hosts (110A, 110M) is implemented as a logical device. The logical device may utilize the computing resources of any number of computing devices and thereby provide the functionality of the production host (110A, 110M) described throughout this application.

In one or more embodiments of the invention, the storage system (144) stores data of the file system (112). While the storage system (144) is illustrated as a separate component, the storage system (144) may be a component of a production host (110A, 110M) without departing from the invention. The storage system (144) may communicate with the production hosts (110) when obtaining compressed data to be stored and/or when transferring data to the production hosts (110).

In one or more embodiments of the invention, the storage system includes one or more storage devices (142A, 142P). In one or more embodiments, each storage device (142A, 142P) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the storage system (144) described throughout this application.

In one or more embodiments of the invention, the storage system (144) is each implemented as a logical device. The logical device may utilize the computing resources of any number of computing devices (e.g., of the production hosts (110)) and thereby provide the functionality of the storage system (144) described throughout this application.

FIGS. 2.1-2.2 show flowcharts in accordance with one or more embodiments of the invention. While the various steps in the flowchart are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2.1-2.2 may be performed in parallel with any other steps shown in FIGS. 2.1-2.2 without departing from the scope of the invention.

FIG. 2.1 shows a flowchart for a method for generating a compression prediction model in accordance with one or more embodiments of the invention. The method shown in FIG. 2.1 may be performed by, for example, a compression optimizing manager (114, FIG. 1). Other components of the system illustrated in FIG. 1 may perform the method of FIG. 2.1 without departing from the invention.

Turning to FIG. 2.1, in step 200, a training dataset of data of multiple types and data parameters is obtained. The training dataset may include multiple files of various extension types, sizes, and data chunk entropy.

In step 202, a compression algorithm is applied to the training dataset to obtain compressed data. In one or more embodiments, any number of compression algorithms or variations of compression algorithms may be applied to the training dataset to obtain different sets of compressed data.

In step 204, compression ratios are calculated for each portion of data of the compressed data. The compression ratios may be calculated at a file level (e.g., for each file in the training dataset), at a file group level (e.g., for a group of files in the training dataset, at data chunk level (e.g., for each data chunk of a given file), or at any other portion of data without departing from the invention.

In step 206, the training of a compression prediction model is performed based on the compression ratios, data parameters, time taken to compress the data, and data types. In one or more embodiments, the training includes associating and/or otherwise mapping compression ratios of a compression algorithm to given data parameters (e.g., extension types of the corresponding file(s), data chunk entropy, popcount, and upper count) of a given portion of data.

In one or more embodiments, the result of the training may include a compression prediction model that inputs one or more data parameters (referred to as input data parameters) and outputs an indication about whether to compress the portion of data. The output may be, for example, a predicted compression ratio of the portion of data. The indication about whether to compress the portion of data is based on whether the compression ratio is above a pre-defined threshold. An example of applying the compression prediction model to store data is described in FIG. 2.2.

In step 210, a trained compression model is stored.

FIG. 2.2 shows a flowchart for processing the storage of data in accordance with one or more embodiments of the invention. The method shown in FIG. 2.2 may be performed by, for example, a compression optimizing manager (114, FIG. 1). Other components of the system illustrated in FIG. 1 may perform the method of FIG. 2.2 without departing from the invention.

In step 220, data to be compressed is obtained. The data may be, for example, one or more files. The data may be obtained in response to a request to store the data using a specified compression algorithm.

In step 222, a data portioning is performed to obtain data chunks of the data. The data chunks may be portions of data that collectively represent the data to be stored. Any mechanism may be performed to partition the data to obtain the data chunks without departing from the invention.

Each data chunk may be processed in accordance with steps 224-236 such that, collectively, the data obtained in step 220 is stored as a collective combination of original data chunks and compressed data chunks.

Turning again to FIG. 2.2, in step 224, an unprocessed data chunk is selected. An unprocessed data chunk is a data chunk generated in step 222 that has not previously undergone steps 224-236.

In step 226, a compression prediction model is applied to the selected data chunk using input data parameters of the data chunk and using the specified compression algorithm to determine a predicted compression ratio.

In step 228, a determination is made about whether the predicted compression ratio is above a pre-defined threshold. The pre-defined threshold may be a value determined by an administrator of the compression prediction model (or any other entity) that relates to a desired level of compression of the stored data. An example pre-defined threshold may be, for example, 1.00. In such example, any data that is predicted to be smaller in size for the compressed data compared to the original data may be stored in compressed format. If the predicted compression ratio is above the pre-defined threshold, the method proceeds to step 232; otherwise, the method proceeds to step 230.

In step 230, following the determination that the predicted compression ratio (or an actual compression ratio discussed in step 234 below) of the selected data chunk does not exceed the pre-defined threshold, the original data (i.e., the data that is not compressed) is stored. The original data may be stored in a storage system (144, FIG. 1).

In step 232, following the determination that the predicted compression ratio is above the pre-defined threshold, the compression algorithm is applied to the selected data chunk to obtain a compressed data chunk.

In step 234, following the compression of the selected data chunk, a determination is made about whether the actual compression ratio (calculated using the data size of the compressed data chunk) is indeed above the pre-defined threshold discussed in step 228. If the actual compression ratio is above the pre-defined threshold, the method proceeds to step 236; otherwise, the method proceeds to step 230.

In step 236, the compressed data chunk is stored. The compressed data chunk may be stored in the storage system.

In step 238, a determination is made about whether all data chunks are processed. If all data chunks are processed, the method ends following step 238; otherwise, the method returns to step 224.

Example

Figure 3:
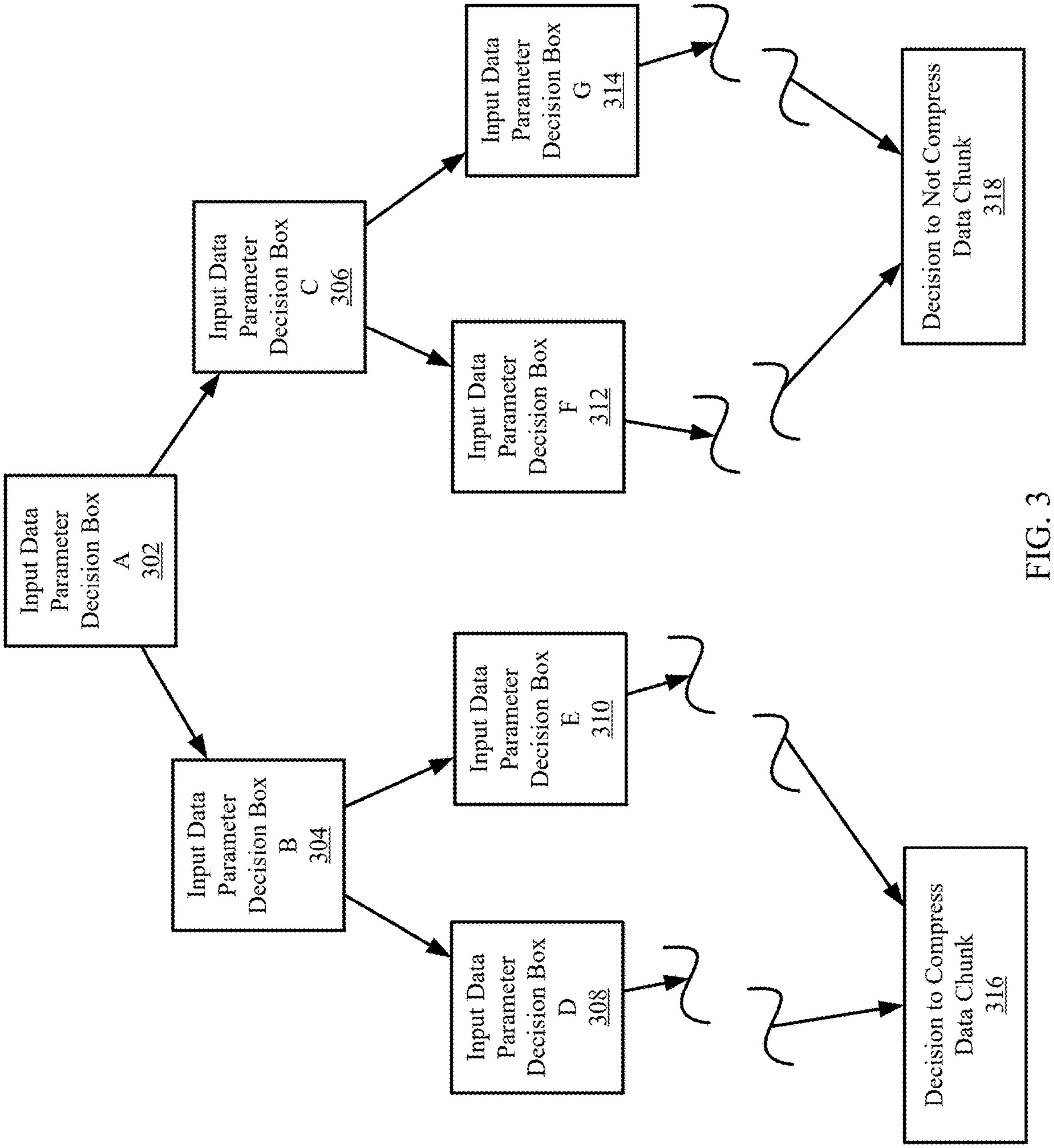
FIG. 3 show a diagram of a decision-tree model in accordance with one or more embodiments of the invention.

The following section describes an example. The example, illustrated in FIG. 3, is not intended to limit the invention. Turning to the example, FIG. 3 shows a diagram of an example compression prediction model. The example compression prediction model is implemented as a decision tree model. The decision tree model may be a machine learning algorithm that applies one or more conditions to determine a selected outcome. The example compression prediction model may include a first input data parameter decision box (302). The first input data parameter decision box (302) may include a series of conditions of the input data parameters to determine a next decision box (B (304) or C (306)) of the input data parameters. Each input data parameter decision box (304, 306, 308, 310, 312, 314) may include its own set of conditions for determining the subsequent input data parameter decision box. In the example, each input data parameter decision box (302, 304, 306, 308, 310, 312, 314) may directly or indirectly lead the input data parameters to be associated with either a decision to compress the data chunk (316) or a decision to not compress the data chunk (318). In this example, input data parameter decision box A (302) corresponds to a first layer of the decision tree model, as it is the first decision box to which the input data parameters are applied. Accordingly, the second layer includes decision box B (304) and C (306). The subsequent third layer includes decision box D (308), E (310), F (312), and G (314). The arrows point from a first decision box of a previous layer to an option for a subsequent decision box based on which conditions are met for the first decision box.

As an example, consider a decision tree model applied to input data parameters that include upper count and popcount. In this example, the first decision box A (302) specifies a condition about whether the upper count of a data chunk is greater than or equal to a first pre-defined value. Decision box B (304) applies to such cases in which the condition is met, and decision box C (306) applies to such cases in which the condition is not met.

Decision box B (304) specifies a condition about whether the popcount is greater than or equal to a second pre-defined threshold. Decision box D (308) applies to such cases where the condition is met, and decision box E (310) applies to such cases where the condition is not met.

Decision box C (306) specifies a condition about whether the popcount is greater than or equal to a third pre-defined value. Decision box F (312) applies to such cases where the condition is met, and decision box G (314) applies to such cases where the condition is not met.

Ultimately, each decision box leads to one of either: a decision to compress the given data chunk (316) or a decision not to compress the data chunk (318). The two decisions may be based, for example on a predicted compression ratio associated with a decision box (302, 304, 306, 308, 310, 312, 314).

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

Embodiments of the invention may improve the efficiency of storing and processing data. Specifically, embodiments of the invention enable use of a compression prediction model on each portion of data to be stored. In traditional storage of data using compression, all data may be compressed, and only the data with a high enough compression ratio is stored as compressed data, and the remaining data is stored originally. Embodiments of the invention reduce the total compression time by only compressing the data that is deemed as having a high enough compression ratio. The total processing time may include the time taken to compress the data that is stored as compressed data in addition to the total time taken to predict which data would be deemed as benefitting from compression. This total processing time is beneficial to any computing system utilizing embodiments of the invention if the condition is true that the total time taken to predict is less than the time it would have taken to compress all data that was not deemed to be stored as compressed data. If the percentage of data not deemed to benefit from being compressed is high enough, the use of the compression prediction model may increase the time taken to store a combination of compressed and original data.

Thus, embodiments of the invention may address the problem of inefficient use of computing resources. This problem arises due to the technological nature of the environment in which production hosts are utilized.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing storage of data, the method comprising:

obtaining, by a compression optimization manager, a request to compress and store data using a compression algorithm;

in response to the request:

selecting a portion of the data;

prior to performing the compression algorithm on the portion of the data, applying a compression prediction model to the portion of the data using input data parameters and the compression algorithm to obtain a first determination that the portion of the data is to be compressed for storage, wherein the input data parameters comprise: a data chunk entropy value, a popcount, and an upper count;

based on the first determination, applying the compression algorithm on the portion of the data to obtain a compressed portion; and storing the compressed portion in a storage system.

2. The method of claim 1, further comprising:

selecting a second portion of the data;

prior to performing the compression algorithm on the portion of the data, applying the compression prediction model to the second portion of the data to obtain a second determination that the second portion of the data is not to be compressed for storage; and storing the second portion of the data in the storage system.

3. The method of claim 2, wherein the second determination is based on a compression ratio of the second portion of the data being below a pre-defined threshold.

4. The method of claim 1, further comprising:

obtaining a training dataset comprising a plurality of files, wherein the plurality of files comprises multiple types of data;

applying a compression algorithm on each of the plurality of files to obtain compressed data;

calculating compression ratios of the plurality of files using the compressed data; and performing a training using the compression ratios, the multiple types of data, and corresponding input data parameters of the training dataset to obtain the compression prediction model.

5. The method of claim 1, wherein the compression prediction model is a decision-tree algorithm.

6. The method of claim 1, wherein determining the first determination comprises:

calculating, using the compression prediction model, a compression ratio for the portion of the data; and determining that the compression ratio is above a pre-defined threshold.

7. A non-transitory computer readable medium comprising computer readable program code, which when executed by a computer processor enables the computer processor to perform a method for managing storage of data, the method comprising:

obtaining, by a compression optimization manager, a request to compress and store data using a compression algorithm;

in response to the request:

selecting a portion of the data;

prior to performing the compression algorithm on the portion of the data, applying a compression prediction model to the portion of the data using input data parameters and the compression algorithm to obtain a first determination that the portion of the data is to be compressed for storage, wherein the input data parameters comprise: a data chunk entropy value, a popcount, and an upper count;

based on the first determination, applying the compression algorithm on the portion of the data to obtain a compressed portion; and storing the compressed portion in a storage system.

8. The non-transitory computer readable medium of claim 7, further comprising:

selecting a second portion of the data;

prior to performing the compression algorithm on the portion of the data, applying the compression prediction model to the second portion of the data to obtain a second determination that the second portion of the data is not to be compressed for storage; and storing the second portion of the data in the storage system.

9. The non-transitory computer readable medium of claim 8, wherein the second determination is based on a compression ratio of the second portion of the data being below a pre-defined threshold.

10. The non-transitory computer readable medium of claim 7, further comprising:

obtaining a training dataset comprising a plurality of files, wherein the plurality of files comprises multiple types of data;

applying a compression algorithm on each of the plurality of files to obtain compressed data;

calculating compression ratios of the plurality of files using the compressed data; and performing a training using the compression ratios, the multiple types of data, and corresponding input data parameters of the training dataset to obtain the compression prediction model.

11. The non-transitory computer readable medium of claim 7, wherein the compression prediction model is a decision-tree algorithm.

12. The non-transitory computer readable medium of claim 7, wherein determining the first determination comprises:

calculating, using the compression prediction model, a compression ratio for the portion of the data; and determining that the compression ratio is above a pre-defined threshold.

13. A system comprising:

a processor; and memory comprising instructions, which when executed by the processor, perform a method comprising:

obtaining, by a compression optimization manager, a request to compress and store data using a compression algorithm;

in response to the request:

selecting a portion of the data;

prior to performing the compression algorithm on the portion of the data, applying a compression prediction model to the portion of the data using input data parameters and the compression algorithm to obtain a first determination that the portion of the data is to be compressed for storage, wherein the input data parameters comprise: a data chunk entropy value, a popcount, and an upper count;

based on the first determination, applying the compression algorithm on the portion of the data to obtain a compressed portion; and storing the compressed portion in a storage system.

14. The system of claim 13, further comprising:

selecting a second portion of the data;

prior to performing the compression algorithm on the portion of the data, applying the compression prediction model to the second portion of the data to obtain a second determination that the second portion of the data is not to be compressed for storage; and storing the second portion of the data in the storage system.

15. The system of claim 14, wherein the second determination is based on a compression ratio of the second portion of the data being below a pre-defined threshold.

16. The system of claim 13, further comprising:

obtaining a training dataset comprising a plurality of files, wherein the plurality of files comprises multiple types of data;

applying a compression algorithm on each of the plurality of files to obtain compressed data;

calculating compression ratios of the plurality of files using the compressed data; and performing a training using the compression ratios, the multiple types of data, and corresponding input data parameters of the training dataset to obtain the compression prediction model.

17. The system of claim 13, wherein determining the first determination comprises:

calculating, using the compression prediction model, a compression ratio for the portion of the data; and determining that the compression ratio is above a predefined threshold.

* * * * *